June 11, 1929.  C. Y. MALCOMB  1,716,648
TIRE REPAIR PATCH
Filed July 26, 1928
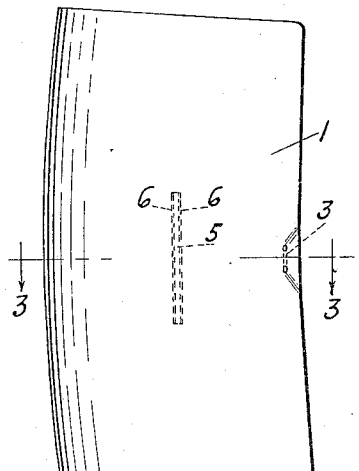
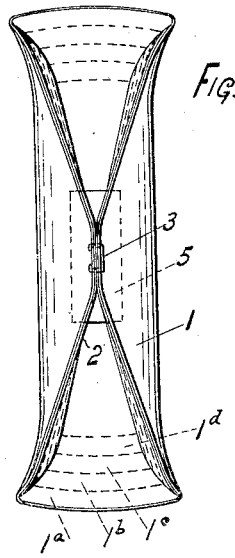
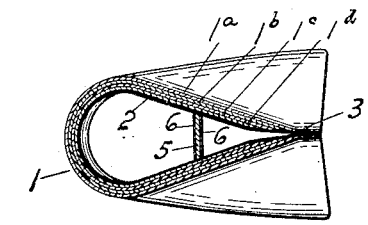
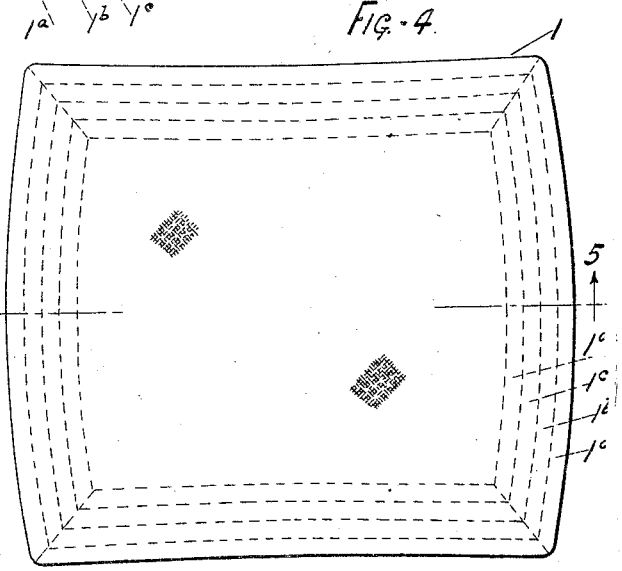
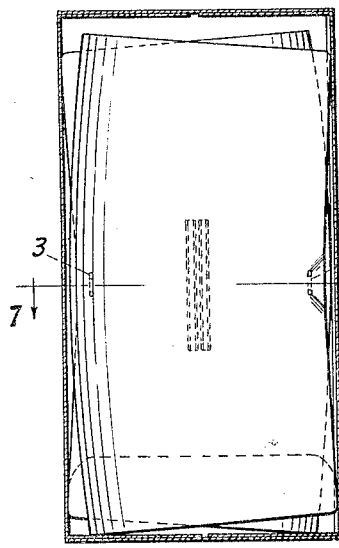
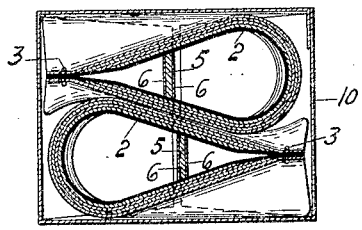
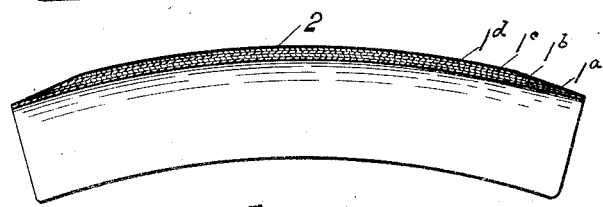
INVENTOR.
CHARLES Y. MALCOMB
BY Ely & Barrow
ATTORNEYS.

Patented June 11, 1929.

1,716,648

UNITED STATES PATENT OFFICE.

CHARLES Y. MALCOMB, OF AKRON, OHIO.

TIRE-REPAIR PATCH.

Application filed July 26, 1928. Serial No. 295,410.

The present invention relates to tire repair patches or blow-out patches which are formed of several layers of fabric, cord or square woven, and rubber and which are intended to be secured to the inside of a tire casing over the punctured or broken portion of the tire. These patches are shaped in arched or curved form so as to fit within and conform to the inner surface of the tire casing and are coated on their outer or convex surfaces with a heavy sticky rubber cement so that they will adhere to the interior of the tire casing.

It is customary, in marketing these articles, to cover them with a layer of muslin, holland or transparent paper to protect the sticky surface from contact with other objects and to preserve the sticky surface, but it necessarily follows that much of the essential and valuable sticky qualities of the patch are lost or absorbed by the protective layer which results either in the initial provision of a less sticky coating or in the loss of much of the valuable properties of a highly adhesive coating.

It is the object of the present invention to construct a new article of commerce in which the necessity for the protective covering is obviated so that a highly adhesive coating or surface may be provided upon the surface of the patch which contacts with the interior of the tire casing, and a much improved patch is obtained. The present invention does not interfere with the packing of the article for shipment, but facilitates the packing and assembly of the article.

It is also an object of the invention to incorporate in the patch a block of rubber which may be used to plug a rent or tear in the casing and to utilize the block of rubber to assist in holding the patch in its condition and preventing contact of the surface of the patch.

These and other objects will be apparent from the description and drawing forming a part hereof, but it will be understood that the showing is merely for the purpose of explaining the invention to those skilled in this art and is not to be taken as limiting the invention to the exact details, for changes and modifications may be made in the invention without altering the essential features thereof as set forth in the claims.

In the drawings in which the preferred form of the invention is shown:

Figure 1 is a side elevation of the improved patch;

Figure 2 is an edge elevation;

Figure 3 is a cross section on the line 3—3 of Figure 1;

Figure 4 is a plan view of the patch ready for application to the tire;

Figure 5 is a section on the line 5—5 of Figure 4;

Figure 6 is a section through a carton with two of the patches assembled therein; and Figure 7 is a section on the line 7—7 of Figure 6.

The patch, except as particularly noted herein, may be of any preferred or known form, that illustrated herein being of the usual or standard construction. It consists of a body 1 composed of a plurality of plies of cured rubberized fabric $1^a$, $1^b$, $1^c$ and $1^d$, which are of progressively smaller areas, the edges of the plies or layers being skived off as shown to provide the entire patch with beveled or feathered edges. The patch is vulcanized and arched both longitudinally and circumferentially to enable it to fit against the inner surface of a tire casing, the smallest layer of the patch being placed on the outer or convex side thereof. The convex surface of the patch is treated with a heavy adhesive coating 2 by which the patch may be secured to the interior surface of the tire.

The patch, when assembled in the commercial form to be sold, is bent or folded in the reverse direction to the natural curvature it would assume as manufactured and the patch is secured in that position by means of a temporary fastener or binder 3. Various forms of binders may be employed, but the most satisfactory one for the purpose has been found to be a light wire staple which is passed through the thin outer edges of the patch to secure the patch in reverse curvature. In this position, the patch is held with the sticky coating 2 on the inside of the patch so that it will not come in contact with any other surface and thereby its effectiveness be destroyed. The principal feature or object of the invention is secured by the reverse folding and fastening of the patch.

In order to prevent the surface 2 from contact and to prevent accidental creasing or cracking of the patch, a bridge member may be placed within the patch in such position as to brace the sides of the patch from contact. For the purpose of supplying this bridge, the preferred form of the invention utilizes a block of uncured rubber 5 which may be provided with protective cloth coverings 6. The block of rubber will adhere at its edges to the sticky surface of the patch. In making certain types of repairs, the block of rubber is placed over the rent or puncture in the tire casing, the heat of running on the road serving to melt the rubber of this block and causing it to flow into the ruptured portion of the casing.

When the device is to be used, the motorist or repairman tears the patch apart at the fastener 3 or removes the fastener and also removes the bridge piece 5. The patch can be readily turned inside out as shown in Figures 4 and 5 and applied to the casing with the sticky or adhesive surface against the interior surface of the casing.

The patch as assembled does not interfere with the packaging of the article as two of the patches can be placed in staggered relation within a carton 10, as shown in Figures 6 and 7.

It will be seen that there is provided a new and useful article of commerce, in which the patch is constructed and assembled so that the sticky or adhesive surface of the patch is always protected and yet is not subjected to deterioration due to the presence of a protective cloth or wrapper.

What is claimed is:

1. A blow-out patch of rubber and fabric of arched form having an adhesive coating upon its normally curved surface, said patch being inverted in curvature so that the adhesive face of the patch is within the patch, and a temporary fastener to hold the patch in its inverted form.

2. A blow-out patch of rubber and fabric of arched form having an adhesive coating upon its normally curved surface, said patch being inverted in curvature so that the adhesive face of the patch is within the patch, and means for holding the patch in its inverted form until ready for application to the tire.

3. A patch for the repair of tires comprising a body having a coating of adhesive upon one surface, the body being folded so that the coated surface is entirely within the body and protected solely by the body, and a temporary retaining member to hold such patch in the form stated until ready for use.

4. A blow-out patch composed of layers of fabric coated with rubber, said patch being vulcanized in arched form, a layer of adhesive upon the normally convex surface of the patch, the patch being inverted for shipment or sale so that the normally convex surface is within the inverted patch and protected solely by the body thereof, and means to hold the patch in such inverted form until used.

5. A blow-out patch composed of layers of fabric coated with rubber, said patch being vulcanized in arched form, a layer of adhesive upon the normally convex surface of the patch, the patch being inverted for shipment or sale so that the normally convex surface is within the inverted patch and protected solely by the body thereof, and a wire staple passed through the edges of said patch to hold it in inverted form.

6. A blow-out patch composed of layers of fabric coated with rubber, said patch being vulcanized in arched form, a layer of adhesive upon the normally convex surface of the patch, the patch being inverted for shipment or sale so that the normally convex surface is within the inverted patch and protected solely by the body thereof, means to hold the patch in such inverted form until used, and a brace extending across the inverted patch from side to side thereof.

7. A blow-out patch composed of layers of fabric coated with rubber, said patch being vulcanized in arched form, a layer of adhesive upon the normally convex surface of the patch, the patch being inverted for shipment or sale so that the normally convex surface is within the inverted patch and protected solely by the body thereof, means to hold the patch in such inverted form until used, and a block of uncured rubber adhering at its edges to the surfaces of the inverted patch and operating as a brace to prevent collapse of the patch.

CHARLES Y. MALCOMB.